Sept. 13, 1966  H. S. ANTOLINI  3,272,264
EARTH-MOVING EQUIPMENT
Filed March 31, 1964  2 Sheets-Sheet 1

INVENTOR.
HENRY S. ANTOLINI
BY
H. W. Brelsford
ATTORNEY

INVENTOR.
HENRY S. ANTOLINI
BY
H. W. Brelsford
ATTORNEY

United States Patent Office  3,272,264
Patented Sept. 13, 1966

3,272,264
EARTH-MOVING EQUIPMENT
Henry S. Antolini, 203 Scott Drive, Santa Maria, Calif.
Filed Mar. 31, 1964, Ser. No. 356,241
3 Claims. (Cl. 172—273)

My invention relates to devices for moving earth, rocks and other heavy objects, and has particular reference to a bolt type of latch mechanism for securing earth-moving tools, such as bulldozer blades and skip loading buckets, to tractors or other prime movers.

Various types of mechanisms have been employed to removeably attach different tools to tractors so that the same tractor can be used for several types of work. Most of these mechanisms require the tractor operator to leave his seat in the tractor and remove and insert various bolts, pins, nuts, and wedges according to the mechanism employed. The present invention is directed to attachment mechanisms of the type that can be operated by the tractor operator without leaving his seat. In this fashion, a single operator alone can change the working tool on the tractor from the bulldozer blade to skip loading bucket, forks, ripper blades, etc. without leaving his seat or position on the tractor, thus saving time and manpower.

The terrific forces generated when a crawler type tractor strikes an immovable obstruction with a bulldozer blade are of such magnitude that ordinary fasteners do not survive. Great strength is required in all attaching mechanisms, and preferably, direct abutment of metal to metal is utilized for forward motion of the tractor. The fastener itself must absorb the lesser shocks and stresses encountered during rearward motion of the tractor. I have found that utilizing the shear strength of a fastener results in maximum strength of the fastener for the amount of material used. This is in contrast to fasteners employing the bending and tension strengths of metal.

I have devised a sliding bolt type of latch to hold earthmoving tools to the tractor or tool arms mounted on the tractor. I employ power means, preferably, hydraulic, to slide the bolts into and out of engagement. The power mechanism is remotely controlled at the operator's seat or position. Guide means are employed so that the tools can be fitted into a tool framework more or less blindly as the operator cannot always observe the precise relative positions of framework and tool.

It is, therefore, a general object of my invention to provide an improved latching mechanism for securing earth-moving tools to a tractor or tractor arms, or spars.

Another object is to provide a bolt type latch mechanism for removably securing a tool to tractor arms.

Still another object is to provide a power actuated, remotely controlled, bolt-type mechanisms for securing tools to tractor arms.

Another object is to provide a bolt latch mechanism for securing earth-moving tools, wherein the bolts are locked in engagement by the mechanical construction of the actuating mechanism and can be unlocked only by reverse operation of the actuating mechanism.

Other objects, advantages and features of my invention will be apparent in the following description and claims, considered together with the accompanying drawings, forming an integral part of this specification in which:

Figure 1:
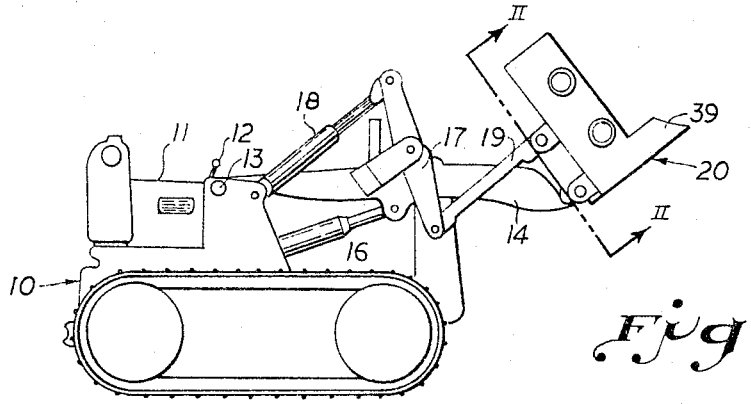
FIG. 1 is an elevation view of a crawler type of tractor having pivoted arms, and on the forward ends is located a latching mechanism embodying the invention.
Figure 2:
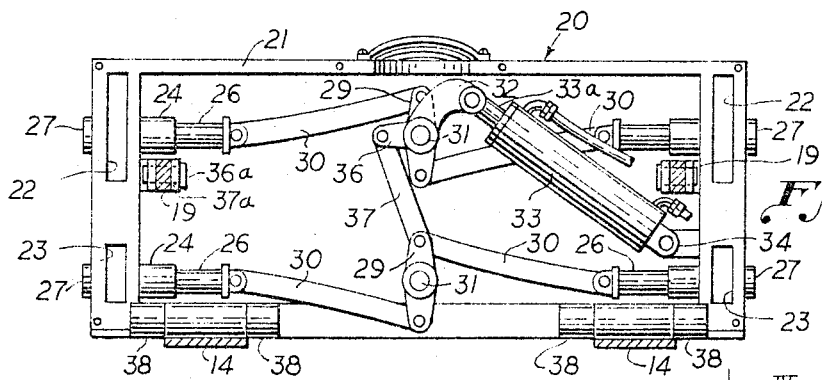
FIG. 2 is an elevation view of the bolt latching mechanism of FIG. 1 taken along the line II—II of FIG. 1, showing the bolts in retracted positions, and with cover plate removed.

Referring to FIG. 1, there is illustrated a crawler type of tractor 10 having a driver's or operator's position 11 with a remote power control handle 12. Pivoted to the tractor at 13 are a pair of forwardly projecting arms 14 and the angle of these arms is controlled by a power cylinder 16. Pivoted to the arms 14 are center-pinned levers 17 having a power cylinder 18 acting on one end, and a link arm 19 connected to the other end. Secured to the arms 19 and 14 is a bolt type of latching mechanism 20 provided particularly in accordance with the invention. Referring now to FIG. 2, the latching mechanism 20 may include a rectangular framework 21 having a plurality of spaced openings 22 on the upper part of the frame and spaced openings 23 on the lower part of the frame. Adjacent each opening is located a bolt receiver 24 in which is slidingly disposed a bolt 26. Preferably also, there is located concentrically with the receivers 24, an outboard bushing 27 to receive the outer end of the bolts 26 when they extend across the openings 22 and 23.

The bolts may be actuated by any suitable mechanism, and I prefer at present to use a pair of rocker arms 29 pivoted to the frame on a shaft 31. Links 30 connect the ends of each rocker arm to one bolt 26. One of the rocker arms 29 may have a dogleg 32 projecting therefrom connected to one end of a power cylinder 33, the other end of which is pivoted to the frame 21 at 34. The rocker arm 29 to which the dogleg 32 is connected, has a crank arm 36 projecting therefrom to which is pivoted a link 37 connected to one end of the other rocker arm 29 so that operation of the power cylinder causes both rocker arms 29 to rotate in unison. The power cylinder 33 has a piston rod 33A connected to the dogleg 32 and this piston rod extends and retracts as the motor is energized.

Figure 3:
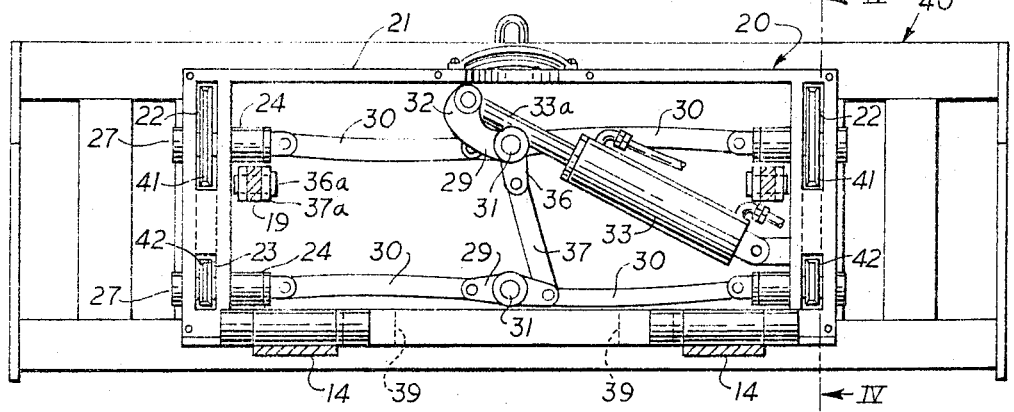
FIG. 3 is a view similar to FIG. 2, but showing the bolts in an extended position latching a bulldozer blade to the tractor arms.

Shown in FIGS. 2 and 3 are the portions of the tractor arms 14 and 19 to which the latching mechanism 20 is secured. A pin 36a passing through a yoke 37a secured to the framework 21 provides a pivot joint for the tractor arms 19 and a stationary hinge construction 38 provides the pivot joint for the tractor arms 14.

Illustrated in FIG. 3 is the mechanism of FIG. 2 with the bolts in an extended or engaging position. In this extended position, the bolts lock or latch a working tool to the framework 21 and hence, lock a tool to the outer ends of the arms 14 and 19 of the tractor. Illustrated in FIG. 3 is a bulldozer blade tool 40 having an upper pair of spaced apertured tongues 41 and a lower pair of spaced apertured tongues 42 fitting into the openings 22 and 23, respectively. The bolts 26 are shown in FIG. 3 passing through the aperture in these apertured tongues 41 and 42. In this fashion, the bulldozer blade 40 is secured to the tractor arms which is permitted to be raised The bolts 26 are moved to their extended position as shown in FIG. 3 by rotation of the rocker arms 29. This is accomplished by extending the power motor 33 causing a counterclockwise rotation of the upper rocker arm 29 which in turn drives the lower rocker arm 29 through crank arm 36 and link 37 to a clockwise rotation.

These two rotations of the rocker arms drive the bolts outwardly across the openings 22 and 23 through the apertures in the aperture tongues 41 and 42, and into engagement also with the outer bushings 27 aligned with the receivers 24. A stop is provided for the rotation of the upper rocker arm 29 which is just past the angle that provides maximum extension of the bolts 26. This provides a positive lock to hold the bolts in their extended position, regardless of any force that might be imposed upon the bolts themselves. This feature, accordingly, provides an over-the-center lock for these bolts. The rotation stop provided by the mechanism of FIG. 3 is the engagement of the piston (not shown) on the piston rod 33A of the motor 33, reaching the end of its stroke and striking the end of the motor 33. Various other types of rotational stops are old and well-known, and accordingly, this stop is illustrative only.

Figure 4:
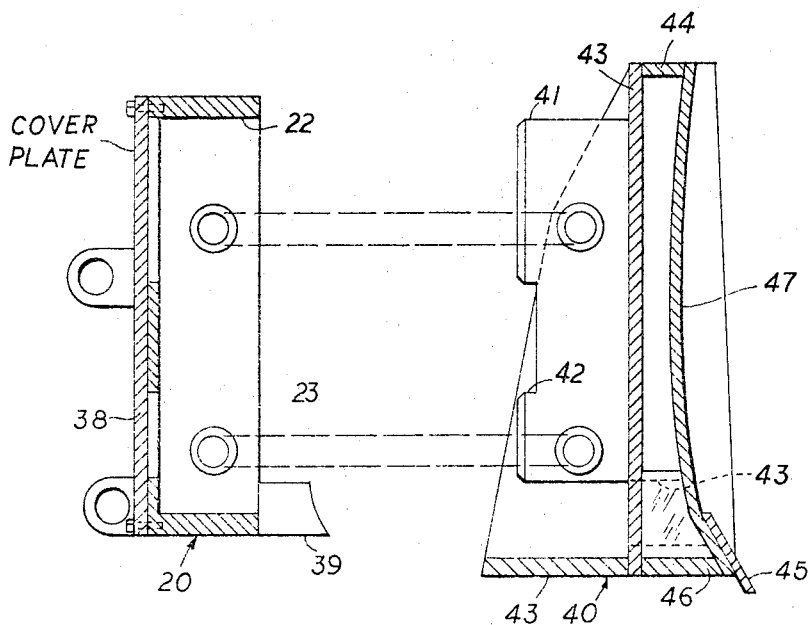
FIG. 4 is an exploded view of the assembly of the bulldozer blade and the latching mechanism as taken along the line IV—IV of FIG. 3.
Figure 5:
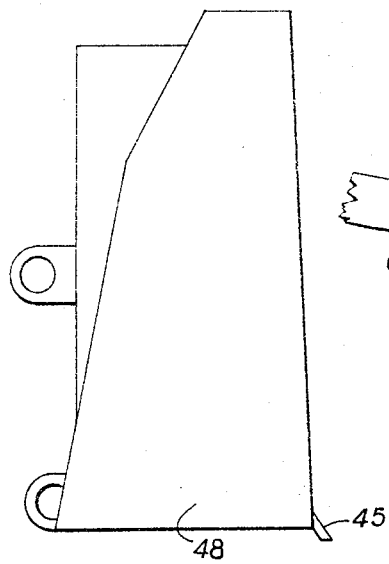
FIG. 5 is an end view of the latch mechanism and bulldozer blade of FIG. 4 locked together by the bolts.

Shown in FIG. 4 is a side view of both the latching mechanism 20 and the bulldozer blade 40, both in section. Projecting from the lower edge of the rectangular latch framework 21 are guide stems 39, and these stems fit into guide holes 43 in the rear of the bulldozer blade 40. These guide stems 39 may be pointed or otherwise shaped on the forward end to better fit into the guide holes 43, and they align the bulldozer blade 40 with the latch mechanism 20 so that the apertured tongues 41 and 42 fit within the openings 22 and 23 of the latch mechanism 20. Both tongues 41 and 42 are formed on a single steel plate. The latch mechanism 20 may have a rear cover plate 38 which is removed in FIGS. 2 and 3. The bulldozer blade 40 may have any suitable shape and construction, and there is illustrated in FIG. 4 a rear vertical plate 43 to which top and bottom members 44 and 46 are secured, and the earth is moved by actual bearing against a curved blade 47. Apertures 45 in the tongues 41 and 42 may be bushed with a wear resistant insert. By reference to FIG. 5, it will be noted that the bulldozer blade 40 may have end plates 48. The wide horizontal bottom dimension of the end plates 48 assists in maintaining the bulldozer blade in an upright position when it is disconnected from the tractor or tractor arms, and is thereby rendered more adaptable for ready attachment. A cutting edge 45 digs into the ground when the blade is not in use, and does not interfere with its upright positioning.

Figure 7:
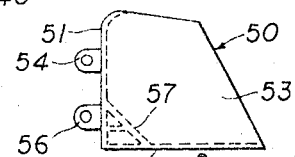
FIG. 7 is a side view on a reduced scale of a skip loader bucket having projecting tongues to be engaged by a latch mechanism embodying the invention.

Illustrated in FIG. 7 is another tool which may be secured to the latching mechanism 20. This tool is a skip loader bucket 50 having a rear plate 51, a bottom plate 52, and side plates 53 at each end. Projecting from the rear plate 51 may be spaced pairs of apertured tongues 54 and 56. Pockets 57 are formed in the bottom of the skip loader bucket 50 and have openings through the rear plate 51 to receive the guide stems 39 of the latch mechanism 20.

Figure 6:
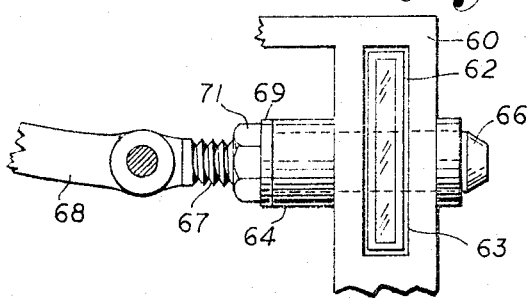
FIG. 6 is a fragmentary view of a modified form of adjustable bolt, showing it piercing an apertured tongue to lock the tongue to a framework.

Illustrated in FIG. 6 is a modified form of bolt construction having an adjustment for exact positioning of the bolt with respect to the actuating link. In that figure, a corner of a latch framework 60 has an opening 62 therein which receives an apertured tongue 63 connected to a bulldozer blade, skip loader bucket, ripper blade, back hoe, or other tool. A receiver 64 receives a bolt 66 which is internally threaded on one end to receive a threaded eye-bolt 67 that is pivoted to an actuating link 68. The bolt 66 may have the usual collar 69 to stop its sliding action in the receiver 64, and a lock nut 71 is threaded on the eye-bolt 67 to fix the position of the bolt 66 on the eye-bolt 67.

In operation, the latching mechanism is secured to the ends of the tractor arms 14 and 19 as shown in FIG. 1. The bolts 26 are normally retracted so that the openings 22 and 23 are clear in the framework 21.

The operator is located at his operator's position 11 on the tractor 10 and maneuvers the tractor and the tractor arms 19 and 14 so that the guide stems 39 on the latch mechanism engage guide holes 43 (FIG. 4) in a bulldozer blade 40 (FIG. 4), or guide pockets 57 in a skip loader bucket (FIG. 7), or other tool. This alignment causes the apertured tongues 41 and 42 of the bulldozer blade 40 to slide into the openings 22 and 23 of the latch framework 21. The tractor operator causes the tractor, and hence, the latch mechanism, to move forwardly against the bulldozer blade 40 until there is tight abutment of the rear plate 43 of the bulldozer blade against the forward edge of the framework 21. At this position, the bolts 26 may then slide freely through the apertured tongues. The bolts are preferably tapered or rounded at their outer end to assist in engaging the apertures 45 of the tongues 41 and 42. To effect this movement of the bolts across their openings 22 and 23, and through the apertures 45, the rocker arms 29 are rotated, preferably by power. The operator of the tractor at his position 11 actuates control 12 which permits fluid under pressure to flow to the motor 33, causing its piston rod 33A to extend, rotating the upper rocker arm 29 counter-clockwise to act through links 30 to move the upper pair of bolts outwardly. The crank arm 36 on the upper rocker arm 29 acts on the link 37 to rotate the lower rocker arm 29 clockwise to move outwardly the lower pair of bolts 26. In this fashion, the bulldozer blade 40 or other tool is securely fastened to the latching mechanism 20 and is thereby secured to the tractor 10. The operator may then use the bulldozer blade or other tool in any desired fashion.

When it is desired to remove the bulldozer blade 40, or skip loader bucket 50, from the latching mechanism 20, the operator actuates the arms 19 and 14 of the tractor to deposit the tool upon the ground in a generally upright position. He then actuates his control 12 to cause power to flow into the power cylinder 33 to retract the piston rod 33A causing the rocker arms 29 to rotate to withdraw the bolts 26. The tractor 10 is then operated rearwardly to back away from the tool, and the latching mechanism 20 is then free to receive another tool as shown in FIG. 1.

It will be appreciated by those skilled in the art that various modifications can be made in the illustrated apparatus without departing from the true spirit and scope of the invention. The bolt type of latches do, however, provide an extremely rugged type of latch for the weight of the mechanism involved. In some types of application, greater strength may be desired for lengthwise blows upon the bulldozer blade 40, or other tools, and this in turn would call for a more rugged connection between the latching mechanism 20 and the tool than that provided by the apertured tongues illustrated. Various types of motors can be employed to move the bolts 26 and various types of linkages can also be used to connect the bolts to the motor. Various types of over-the-center locks or other locks may be employed to insure that the bolts will not work out of engagement. Accordingly, there is encompassed within the following claims all modifications that fall within the true spirit and scope of my invention.

I claim:

1. A latching mechanism for removably securing to a tractor or other prime mover various tools having apertured tongues projecting therefrom comprising:

(a) A framework adapted to be secured to the tractor and having a plurality of openings to receive the tongues of the tools;

(b) bolt receivers secured to the framework adjacent to a plurality of said openings;

(c) bolts slidably disposed in each receiver;

(d) power means;

(e) mechanical connections between the bolts and the power means for sliding said bolts into and out of said apertures to respectively engage the apertures of tongues and to release the tongues, and
(f) mechanical means for holding the bolts in engagement in the apertures to lock a tool to the framework.

2. A latching mechanism for removably securing to a tractor or other prime mover various tools having apertured tongues projecting therefrom and having also guide receiving apertures comprising:
  (a) a framework adapted to be secured to the tractor and having a plurality of openings to receive the tongues of the tools;
  (b) a plurality of guide stems projecting from the framework in registry with the guide receiving apertures on the tool;
  (c) bolt receivers secured to the framework adjacent to a plurality of said openings;
  (d) bolts slidably disposed in each receiver;
  (e) power means; and
  (f) mechanical connections between the bolts and the power means for sliding said bolts into and out of said apertures to respectively engage the apertures of tongues and to release the tongues, said guide stems fitting within the guide receiving apertures of the tool to assist alignment of tool tongues with framework openings.

3. The combination of (1) a tool for attachment to prime movers, said tools having apertured tongues projecting from one side thereof, and (2) a sliding bolt latching mechanism to secure said tool to a prime mover, said latching mechanism comprising:
  (a) a framework having two spaced openings therein for receiving two tongues of the tool;
  (b) a bolt guide on the framework disposed adjacent each opening;
  (c) a sliding bolt in each guide slidable to a position over the opening to engage the aperture of a tongue;
  (d) a double ended rocker arm pivoted to the frame in the area between the bolts;
  (e) a link connecting one bolt to each end of the rocker arm;
  (f) power means for rotating the rocker arm to slide the bolts across the apertures and away from the apertures to latch and unlatch the tool; and
  (g) and means for limiting the rotation of the rocker arm to an angle just beyond maximum bolt extension to act as an over-the-center lock to lock the bolts in their extended tongue-engaging position.

References Cited by the Examiner

UNITED STATES PATENTS

| | | | |
|---|---|---|---|
| 2,447,150 | 8/1948 | Andersen | 214—145 |
| 2,710,464 | 6/1955 | Husting | 172—275 X |
| 3,034,237 | 5/1962 | Wolfe et al. | 214—145 X |
| 3,115,261 | 12/1963 | Antolini | 37—117.5 X |
| 3,204,793 | 9/1965 | Lane | 214—140 |

HUGO O. SCHULZ, *Primary Examiner.*